(12) United States Patent
Mauro

(10) Patent No.: US 6,373,627 B1
(45) Date of Patent: Apr. 16, 2002

(54) COMPENSATION MECHANISM FOR COMPONENT AND ASSEMBLY DEVIATION IN AN COMPONENT PRECISION POSITIONING STAGE

(76) Inventor: George Mauro, 26 Keewaydin Dr., Suite B, Salem, NH (US) 03079

( * ) Notice: Subject to any disclaimer, the term of this patent is extended or adjusted under 35 U.S.C. 154(b) by 0 days.

(21) Appl. No.: 09/875,358

(22) Filed: Jun. 6, 2001

Related U.S. Application Data

(63) Continuation-in-part of application No. 09/667,035, filed on Sep. 21, 2000, now Pat. No. 6,266,184.

(51) Int. Cl.[7] .............................................. G02B 21/26

(52) U.S. Cl. ........................ 359/393; 359/391; 359/813

(58) Field of Search ................................. 359/391–395, 359/805–809, 811–820, 896; 248/429–430, 468, 474, 480; 312/334.8, 334.13; 384/42, 17, 23; 313/319–330, 333

(56) References Cited

U.S. PATENT DOCUMENTS

| | | | |
|---|---|---|---|
| 3,932,010 A | 1/1976 | Kenworthy | 312/320 |
| 3,960,443 A | 6/1976 | Goshima et al. | 359/813 |
| 4,652,095 A | 3/1987 | Mauro | 359/393 |
| 4,919,484 A | 4/1990 | Bougher et al. | 297/474 |
| 4,953,988 A | 9/1990 | Tsukada | 384/8 |
| 5,077,620 A | 12/1991 | Mauro | 359/393 |
| 5,626,405 A | 5/1997 | Banks | 312/334.8 |
| 5,676,341 A | 10/1997 | Tarusawa et al. | 248/430 |
| 6,266,184 B1 * | 7/2001 | Mauro | 359/393 |

\* cited by examiner

*Primary Examiner*—Thong Nguyen
(74) *Attorney, Agent, or Firm*—Davis & Bujold, P.L.L.C.

(57) ABSTRACT

A compensation mechanism for correcting component fabrication and assembly deviations in component precision positioning stages utilizing a planar mounting table arranged to slide between two rails consisting of a pair of grooves disposed adjacent one edge of the table and a single groove adjacent an opposite edge of the table, a spring arrangement forming slot being provided in close proximity to opposite edge to provide spring bias of the grooves against the rails.

8 Claims, 2 Drawing Sheets

COMPENSATION MECHANISM FOR COMPONENT AND ASSEMBLY DEVIATION IN AN COMPONENT PRECISION POSITIONING STAGE

RELATED APPLICATION

This is a continuation-in-part application of U.S. patent application Ser. No. 09/667,035 filed Sep. 21, 2000 now U.S. Pat. No. 6,266,184.

BACKGROUND OF THE INVENTION

1. Field of the Invention

The invention resides in the field of adjustable workpiece mounting stages and more particularly relates to a modification in the mounting table to which the work pieces are attached to compensate for minor deviations in component fabrication and stage assembly.

2. Description of the Prior Art

Precision positioning stages of the type relating to the invention are disclosed in U.S. Pat. Nos. 4,652,095 and 5,077,620 issued to the applicant. In the first of these, the device described employs an adhesive assembly concept for a stage utilizing two end plates having grooves for receiving a pair of parallel smooth cylindrical rails and a mounting table slidably disposed between the plates.

In the second of these, which is an improvement of the first, there is disclosed an electrical motor, gear system, and encoder mounted on an additional plate also disposed between the rails, the motor being operationally connected to the mounting table by a threaded rod such that the table is moved by actuation of the motor.

In the manufacture and construction of these precision devices, great care must be taken in fabricating the component parts and assembling them into a finished unit. Some tolerances must be within one or two ten-thousandths of an inch for both fabrication and assembly in order to achieve a unit which will function properly over a period of time. It has been found that even the most rigorous shop standards will not prevent the limited performance and possible failure of a percentage of units which is greater than desirable. Further, additional units which function well upon delivery will, over a period of time, wear to the point of unacceptable performance. The present invention is intended to alleviate the above mentioned problems in the interaction of the two main components of these stages, i.e. the rails and the mounting table which moves between them. This is accomplished by a modification to the mounting table providing a take-up mechanism to compensate for minor deviations in component fabrication and assembly.

SUMMARY OF THE INVENTION

The invention may be summarized as a compensation or take-up mechanism to reduce the requirement for extreme accuracy in the subject stages, to prevent excessive looseness or tightness in the back and forth motion of the mounting table on the rails, to prevent jogging, i.e. abrupt or non-linear motion of the table and generally to provide a cushioned fit between the table and the rails. The above objectives are achieved by disposing a pair of spaced projections, each having a groove at one edge of the table to engage one of the rails and a single projection, having a groove, intermediate the pair of spaced projections at the opposite edge of the table to engage the other of the rails. The grooves are arranged to be substantially parallel to the upper and lower planar surfaces of the table. An elongate slit parallel to the rails and disposed adjacent to the single projection forms a leaf spring arrangement urging the grooves into engagement with the rails, the table being constructed of metal or plastic chosen to provide the desired spring action.

According to the invention there is provided a component precision positioning stage, comprising a pair of straight smooth unthreaded rails secured in spaced apart parallel relationship, a component mounting table slidably mounted to and disposed over said rails, said mounting table being a planar rectangular member having three inwardly facing rail engaging grooved projections disposed adjacent opposing edges of the table, two said grooved projections being spaced apart on one of said opposing edges and engaging one of the rails and the other of the grooved projections being centrally positioned adjacent the other of the opposing edges and engaging the other of the rails, and a slot in said table, closed at its ends, parallel to and in close proximity to the opposing edge of the other of the grooved projections, to define a leaf spring arrangement biasing the grooved projections together whereby grooves of the grooved projections resiliently engage the rails.

Preferably the table has a central threaded bore positioned to engage a threaded rod adapted to be driven by a stage drive means, the three grooved projections form a triangle of rail engaging locations on the table with said two grooved projections disposed at one opposing edge of the table and the slot extends to closely adjacent the opposed ends of the table.

Also according the invention there is provided a precision component positioning stage comprising:

a) first and second smooth straight unthreaded cylindrical rails supported in spaced apart parallel relationship;

b) a component mounting table defining first and second grooves spaced along and engaging said first rail and defining a third groove intermediate of the first and second grooves and engaging said second rail; and c) a pair of cantilever springs defined by the table to bias said grooves inwardly into engagement with said rails whereby deviations from a true linear path are prevented by said bias.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
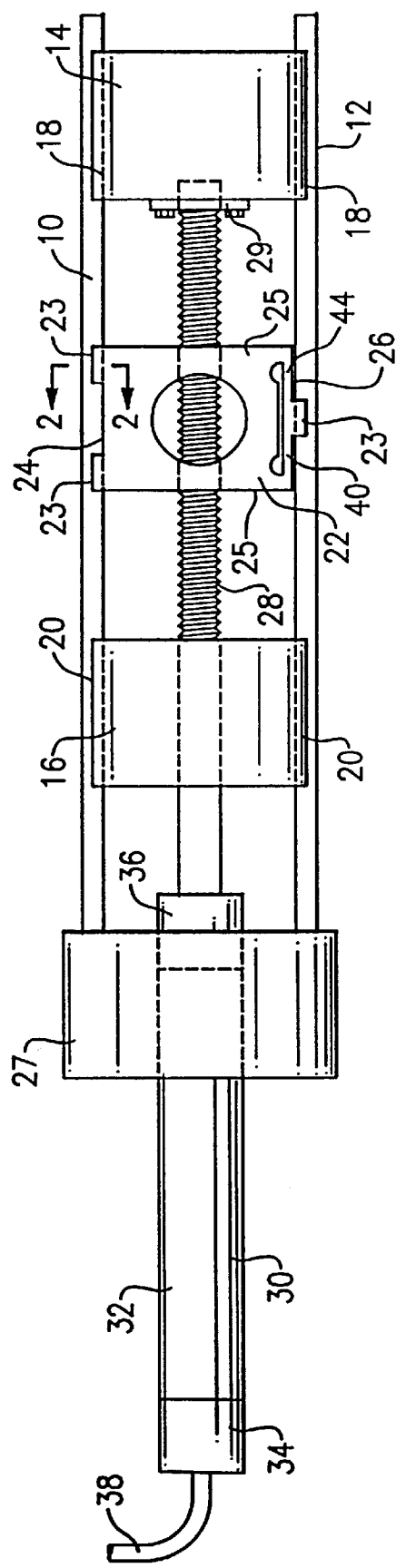
FIG. 1 is a plan view of a positioning stage incorporating the first embodiment of the invention.

FIG. 1 illustrates the preferred embodiment of the invention as utilized in a precision positioning stage employing electric motor for moving the mounting table. Smooth cylindrical parallel rails 10, 12 are spaced apart by and adhesively attached to end plates 14, in grooves 18, 20 respectively. Component mounting table 22 having three projections 23, each defining a rail receiving groove, is slidably disposed between rails 10, 12. The projections 23 consist of two projections spaced apart on one longitudinal edge 24 of the table to engage rail 10 adjacent opposite ends 25 of the table, and a single projection located centrally on the opposite longitudinal edge 26 of the table to engage rail 12 centrally intermediate the ends 25. A fixed motor assembly mounting plate 27 is attached to rails 10, 12. Partially threaded rod 28 extends through end plate 16, is threadably engaged with mounting table 22 and is rotationally connected to end plate 14 by clamp 29.

Motor assembly 30, consisting of electric motor 32, motor revolution sensing encoder 34, and speed reduction gear train 36, is mounted on plate 27. Rotation of the motor, electrically energized through cable 38, rotates rod 28 and moves table 22 back and forth between end plates 14, 16 along the rails 10, 12.

As the scale of the above described device is extremely small, the table being approximately one-half inch square and 0.2 inches thick with the extent of mounting table travel being in the vicinity of one to two inches, it will be seen that the tolerance of component fabrication and assembly is quite critical for smooth and accurate operation. Disposition of slit 40, approximately 0.008 inch wide, extending through the table 22 in close proximity to longitudinal edge 26 provides a measure of compensation for manufacturing inaccuracies which has been found to greatly increase the acceptability of finished units as compared to stages without the present invention. This slit 40 extends parallel to rail 12 for a substantial portion of the length of the table 22 between ends 25 thereby to form a leaf spring 44 parallel to rail 12 and edge 26, arranged to urge the grooves into engagement with the respective rails 10, 12 with a force of about one pound. The slit may be machined by EDM and EDM wire threading openings may be provided at the ends of the slit, as illustrated.

Figure 2:
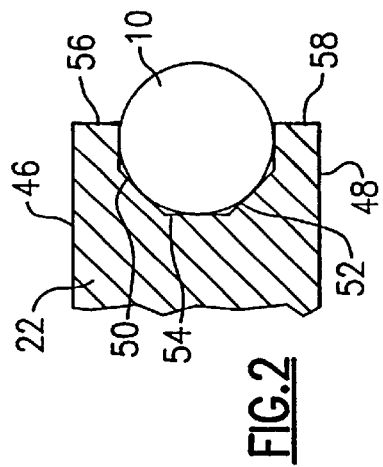
FIG. 2 is cross-section of one of the rail engaging grooves of the table 22 of FIG. 1 taken on section line 2—2 of FIG. 1.

FIG. 2 provides an enlarged view of the groove of one of the projections 23, all three of which are identical in cross-section. In particular FIG. 2 illustrates the positioning of the grooves between upper and lower surfaces 46, 48 of table 22. Each groove comprises two rail engaging faces 50, 52 disposed at 45° to the surfaces 46, 48 and spaced by a vertical surface 54 spaced from the rail engaging surfaces 50, 52.

Surfaces 56, 58, perpendicular to surfaces 46, 48, extend over the associated rail in spaced relationship thereto to ensure retention of the table 22 on the rails 10, 12.

It has been found that this invention's use of three grooved projections in the arrangement described provides compensation of the table on the rails equal to that of prior art designs while the spring bias action is greatly facilitated by the slit design also described.

Figure 3:
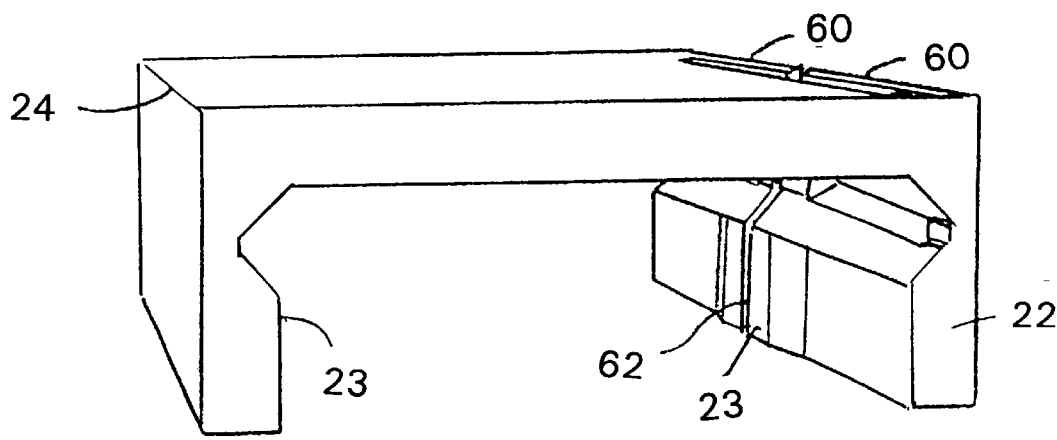
FIG. 3 is a perspective view of a second embodiment of a table of a positioning stage shown in FIG. 1.
Figure 4:
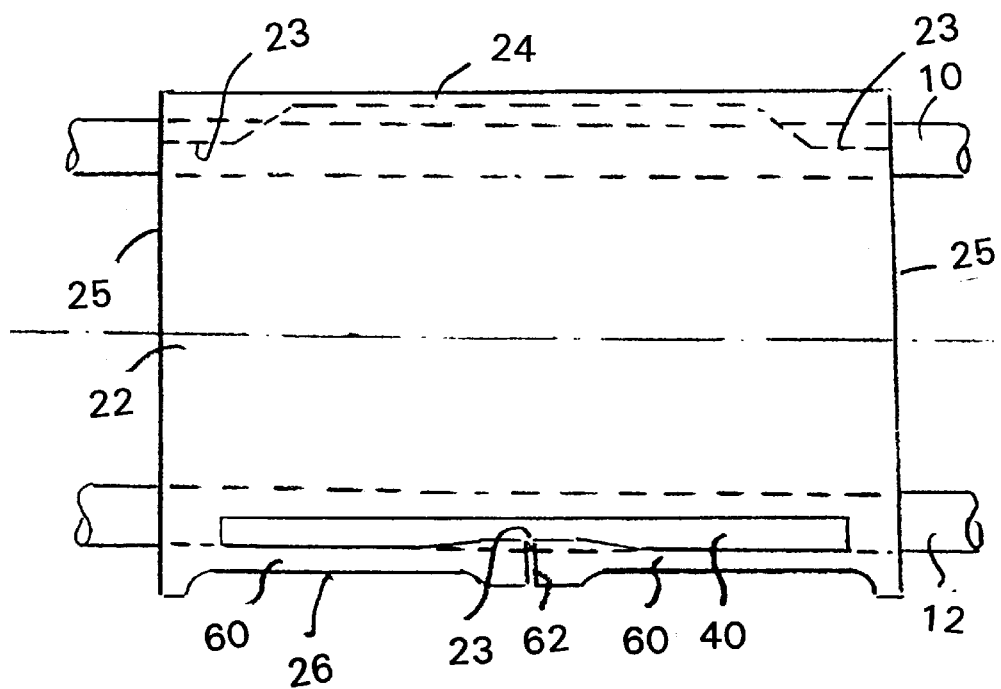
FIG. 4 is a plan view of a portion of the positioning stage of the present invention with t table shown in FIG. 3.

FIGS. 3 and 4 illustrate a second embodiment in which the table 22 fits over the rails 10,12 instead of between them. Except as now described, the features of the second embodiment are similar to the first embodiment and will not again be described here.

The component mounting table 22, has three inwardly facing projections 23, formed on downwardly extending side parts of the table, each defining a rail receiving groove, is slidably mounted on the rails 10, 12. The projections 23 consist of two projections spaced apart adjacent one longitudinal edge 24 of the table to engage rail 10 adjacent opposite ends 25 of the table, and a single split projection located centrally on the opposite longitudinal edge 26 of the table to engage rail 12 centrally intermediate the ends 25. A partially threaded rod 28 (not shown in FIGS. 3 and 4) is threadably engaged with mounting table 22 and is rotationally connected to plate 14 by a clamp 29 (see FIG. 1).

A slot 40, closed at both ends and approximately 0.008 inch wide, extends through the table 22, is disposed in close proximity to the longitudinal edge 26 to provide a measure of compensation for manufacturing inaccuracies and has been found to greatly increase the acceptability of finished units as compared to stages without the present invention. This slot 40 is centered on the single projection and extends parallel to rail 12 for a substantial portion of the length of the table 22 between ends 25 thereby to form a pair of cantilever springs 60 parallel to rail 12 and edge 26 and separated by a vertical slot 62 centrally disposed in the adjacent projection 23. The leaf springs are arranged to urge the grooves into engagement with the respective rails 10, 12 with a force of about one pound.

The second embodiment allows a wider disposition of the table support points on the rails and an increase in the table length (up to twice that length of the table of the first embodiment). Assembly of the stage is also simplified.

What is claimed is:

1. A precision component positioning stage comprising:
   a) first and second smooth straight unthreaded cylindrical rails supported in spaced apart parallel relationship;
   b) a component mounting table defining first and second grooves spaced along and engaging said first rail and defining a third groove intermediate of the first and second grooves and engaging said second rail; and
   c) a pair of cantilever springs defined by the table to bias said grooves inwardly into engagement with said rails whereby deviations from a true linear path are prevented by said bias.

2. The stage of claim 1 comprising means for moving the table along the rails.

3. The stage of claim 1 wherein the cantilever springs are formed by a slot in the table closed at both ends and separated by an opening centered on the third groove, the slot being disposed parallel to, closely adjacent the third groove and centered on the third groove.

4. An component precision positioning stage, comprising a pair of straight smooth unthreaded rails secured in spaced apart parallel relationship, a component mounting table slidably mounted to and disposed over said rails, said mounting table being a planar rectangular member having first, second and third rail engaging projections projecting from opposed side edges of the table, each projection defining a groove, the first and second projections being spaced apart on one of said opposed side edges with the grooves of these first and second projections engaging one of the rails and the third projection being centrally positioned an the other of the opposed side edge with the groove of the third projection engaging said other of the rails, and a slot in said table, closed at its ends, parallel to and in close proximity to the third projection, to define a leaf spring arrangement biasing the grooves of the first, second and third projections to resiliently engage the rails.

5. The stage of claim 4 wherein said table has a central threaded bore positioned to engage a threaded rod adapted to be driven by a state drive means.

6. The stage of claim 4 wherein the grooves of the three projections form a triangle of rail engaging locations on the table.

7. The stage of claim 6 wherein the slot extends to closely adjacent opposed ends of the table.

8. The stage of claim 7 wherein the slot defines two cantilever springs forming the spring arrangement and being formed by a slit located centrally of the third of the projections.

* * * * *